Patented Nov. 23, 1937

2,099,757

UNITED STATES PATENT OFFICE 2,099,757

ESTERS OF FORMALS AND METHOD OF PREPARING THEM

George W. Seymour, Cumberland, Md., assignor to Celanese Corporation of America, a corporation of Delaware No Drawing. Application July 12, 1933, Serial No. 680,082

9 Claims. (Cl. 260—103)

This invention relates to new esters of formals and to the preparation of the same.

An object of my invention is to prepare new esters of formals or methylene ethers of polyhydric alcohols. Other objects of my invention will appear from the following detailed description.

I have found that esters of formals or methylene ethers of polyhydric alcohols are capable of forming solutions with derivatives of cellulose and are excellent plasticizers, softening agents, or camphor substitutes for use in conjunction with derivatives of cellulose to impart softness, pliability and other desirable properties to plastics, films, textiles, and other materials containing derivatives of cellulose.

Compositions containing cellulose derivatives and the esters of this invention form the subject matter of my divisional application S. No. 748,659.

In accordance with my invention, I prepare new esters of formals or methylene ethers of polyhydric alcohols by any suitable method.

The esters embraced within this invention may be produced by the reaction of a suitable organic acid or the anhydride of such acid with a formal or methylene ether of a polyhydric alcohol. The organic acid radical of such ester is preferably that of an aromatic or cyclic carboxylic acid, such as benzoic acid, phthalic acid, trimesic acid, naphthoic acid or naphthenic acid.

The formals employed for making the esters preferably contain at least one hydroxy group and may be prepared by the condensation of formaldehyde, formalin, trihydroxymethylene or paraformaldehyde with a suitable polyhydric alcohol such as diethylene glycol, glycerol, triethylene glycol, etc., in the presence of an acidic catalyst, such as ferric chloride or other acid salts, hydrochloric acid, sulfuric acid, phosphoric acid or other strong and weak mineral acid.

Any suitable method may be employed in the preparation of these esters of formals. Thus the formal may be caused to react with the anhydrides or chlorides of the aromatic carboxylic acid. Alternatively the formal may be caused to react with the acid by heating them in the presence of a catalyst or condensing agent such as sulfuric acid.

By way of illustration, but without being limited thereto, the following example of making diethylene glycol formal phthalate is given.

Two (2) molecular proportions of diethylene glycol are condensed with one (1) molecular proportion of para-formaldehyde in the presence of sulfuric acid as catalyst, by heating under reflux for about 18 hours. The water is removed by distillation, and the diethylene glycol formal is distilled under vacuum.

To make the ester, equi-molecular proportions of the diethylene glycol formal and phthalic anhydride are condensed by heating in an open container. The temperature may be varied over a wide range; it is usually sufficient to maintain the temperature at about the boiling point of water. Substantially theoretical yields of diethylene glycol formal phthalate are obtained.

Any suitable derivative of cellulose may be employed in conjunction with the esters of formals, such as cellulose nitrate but I prefer to employ organic derivatives of cellulose, such as organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

Plastic compositions containing the derivative of cellulose and the esters of the formals may be made in any suitable manner and they may be worked up into sheets, rods, tubes, blocks or any other desired shape. Molding powder containing the derivative of cellulose and the ester of the formals in intimate association but containing little or no solvent may be made, and these powders may be molded under heat and pressure to any desired shape. Filaments, yarns and other textile materials may be made from solutions containing the organic derivatives of cellulose and the ester of the formals by extrusion through orifices into an evaporative atmosphere, as in dry spinning, or into a precipitating bath as in wet spinning.

Solutions of the organic derivative of cellulose and the ester of the formal in a volatile solvent may be cast or extruded onto a smooth surface and the volatile solvent permitted to evaporate to form films that may be used for photographic or other purposes. Another application of this invention is in the preparation of laminated glass wherein a plastic sheet containing the derivative of cellulose and the ester of the formal is interposed between sheets of glass. Coating compositions such as lacquers may be formed containing the derivative of cellulose and the ester of the formal dissolved in appropriate solvent mixtures, and resins, either synthetic or natural, compatible with the derivative of cellulose may be added thereto.

The proportion of the ester of the formal to the derivative of cellulose may be varied in accordance with the particular requirements. Generally I have found that in the case of its use with cellulose acetate, the ester of the formal may be employed in amounts of 10% or less to 60% to 100% or more of the weight of the cellulose acetate.

In making the compositions in accordance with my invention, the ester of the formal may be employed as the sole plastifying agent, or it may be used in conjunction with other plastifiers such as triacetin, dibenzyl tartrate, diethyl tartrate, dibutyl tartrate, diethyl phthalate, the phthalate of the monomethyl ether of ethylene glycol, etc.

In making these compositions, solvents of appropriate nature, such as acetone, methyl acetate, ethylene formal, ethyl lactate, formal glycerol, diacetone alcohol, of varying boiling points may be used to suit the particular requirements. Effect materials such as pigments, filling materials or dyes may be added to produce any desired effect.

It is to be understood that the foregoing detailed description is given merely by way of illustration, and that many variations may be made therein without departing from the spirit of my invention.

Having described my invention, what I claim and desire to secure by Letters Patent is:

1. An ester of an acyclic formal of a dihydric alcohol with an isocyclic carboxylic acid.
2. An aromatic carboxylic acid ester of an acyclic formal of a dihydric alcohol.
3. A phthalic acid ester of an acyclic formal of an alcohol containing at least two and not more than three hydroxy groups.
4. An ester of the acyclic formal of diethylene glycol with an isocyclic carboxylic acid.
5. An aromatic carboxylic acid ester of the acyclic formal of diethylene glycol.
6. A phthalic acid ester of an acyclic formal of a dihydric alcohol.
7. A phthalic acid ester of the acyclic formal of diethylene glycol.
8. The method of preparing an ester of an acyclic formal of a dihydric alcohol comprising reacting an acyclic formal of a dihydric alcohol with a reactant selected from the group consisting of the anhydrides and the halides of an isocyclic carboxylic acid.
9. The method of preparing an ester of an acyclic formal of a polyhydric alcohol comprising reacting an acyclic formal of a polyhydric alcohol containing no more than three hydroxy groups with a reactant selected from the group consisting of the anhydrides and the chlorides of an isocyclic carboxylic acid.

GEORGE W. SEYMOUR.